(12) United States Patent
Clavel

(10) Patent No.: US 7,634,947 B2
(45) Date of Patent: Dec. 22, 2009

(54) METHOD AND DEVICE FOR CONFIRMATION OF THE STATE OF TIGHTNESS OF FASTENINGS OF RAILROAD TRACKS

(75) Inventor: Juan Vives Clavel, Albuixech Valencia (ES)

(73) Assignee: Plasticos Mondragon, S.L.U., Valencia (ES)

( * ) Notice: Subject to any disclaimer, the term of this patent is extended or adjusted under 35 U.S.C. 154(b) by 381 days.

(21) Appl. No.: 11/435,205

(22) Filed: May 15, 2006

(65) Prior Publication Data

US 2006/0272539 A1   Dec. 7, 2006

Related U.S. Application Data

(60) Provisional application No. 60/695,986, filed on Jul. 1, 2005.

(51) Int. Cl.
  *B61J 1/00* (2006.01)
(52) U.S. Cl. .................................. 73/714; 104/118
(58) Field of Classification Search .................. 73/714; 104/137
See application file for complete search history.

(56) References Cited

U.S. PATENT DOCUMENTS 5,740,651 A   4/1998   Vanotti

| 2002/0056592 | A1* | 5/2002 | Arens et al. .................. 184/3.1 |
| 2002/0170395 | A1* | 11/2002 | Wang et al. ..................... 81/467 |
| 2007/0078574 | A1* | 4/2007 | Davenport ..................... 701/19 |
| 2008/0128563 | A1* | 6/2008 | Kumar et al. ............. 246/187 A |
| 2008/0303518 | A1* | 12/2008 | Heyden et al. ............... 324/244 |

FOREIGN PATENT DOCUMENTS

| EP | 1 077 287 | 7/2001 |
| ES | 2 115 427 | 6/1998 |
| ES | 2 156 564 | 6/2001 |
| ES | 2 160 529 | 11/2001 |

* cited by examiner

Primary Examiner—Andre J Allen
(74) Attorney, Agent, or Firm—Schiff Hardin LLP

(57) ABSTRACT

A method and a device for confirmation automatically of the state of tightness of fastenings of railroad tracks are provided, so that from a train that is traveling over a track it is possible to detect a signal from each of the fastenings which indicates if the degree of tightness of these fastenings is sufficient, or if, to the contrary, the fastening is deficient because it is either loose or damaged. For this, a device according to the invention comprises a pressure sensor element and at least one electrically conducting element connected to the pressure sensor, whereby a variation is produced of at least one electric magnitude/value proportional to the pressure of tightness present in at least one point in said fastening during the passage of a train. The invention also relates to an insulating plate for fastenings and to railroad track plant, which incorporate a sensor device object of the invention.

23 Claims, 11 Drawing Sheets

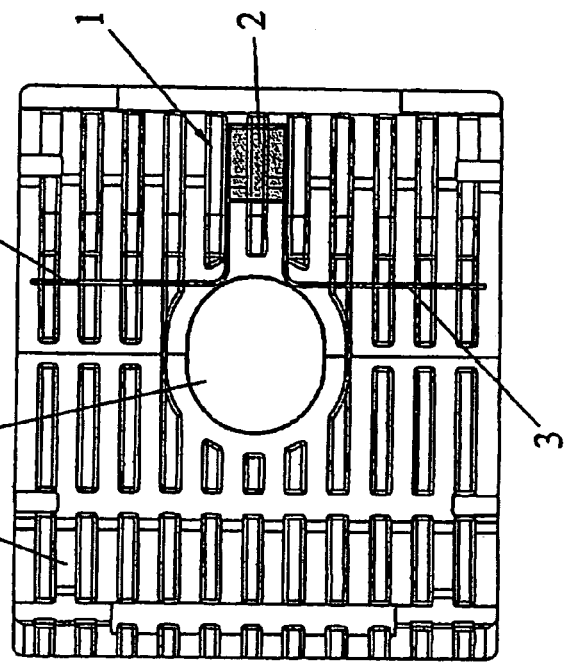
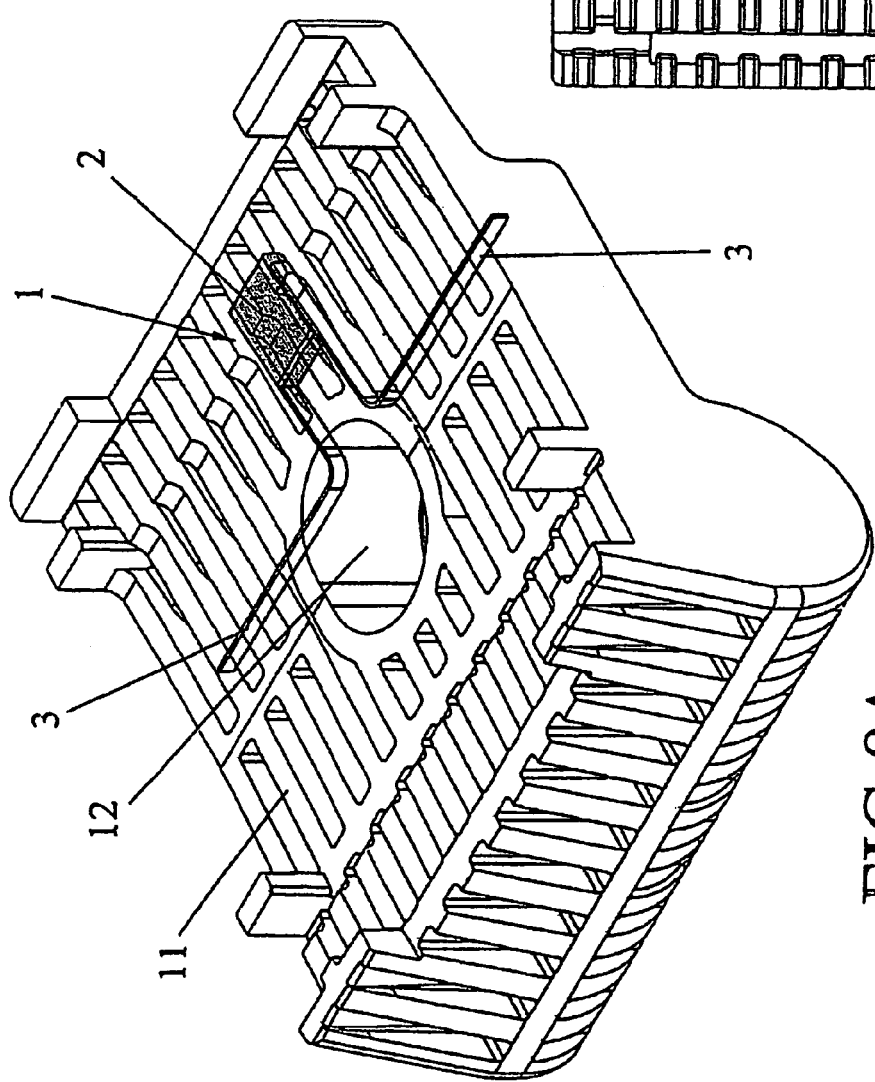
FIG. 8B
FIG. 8A

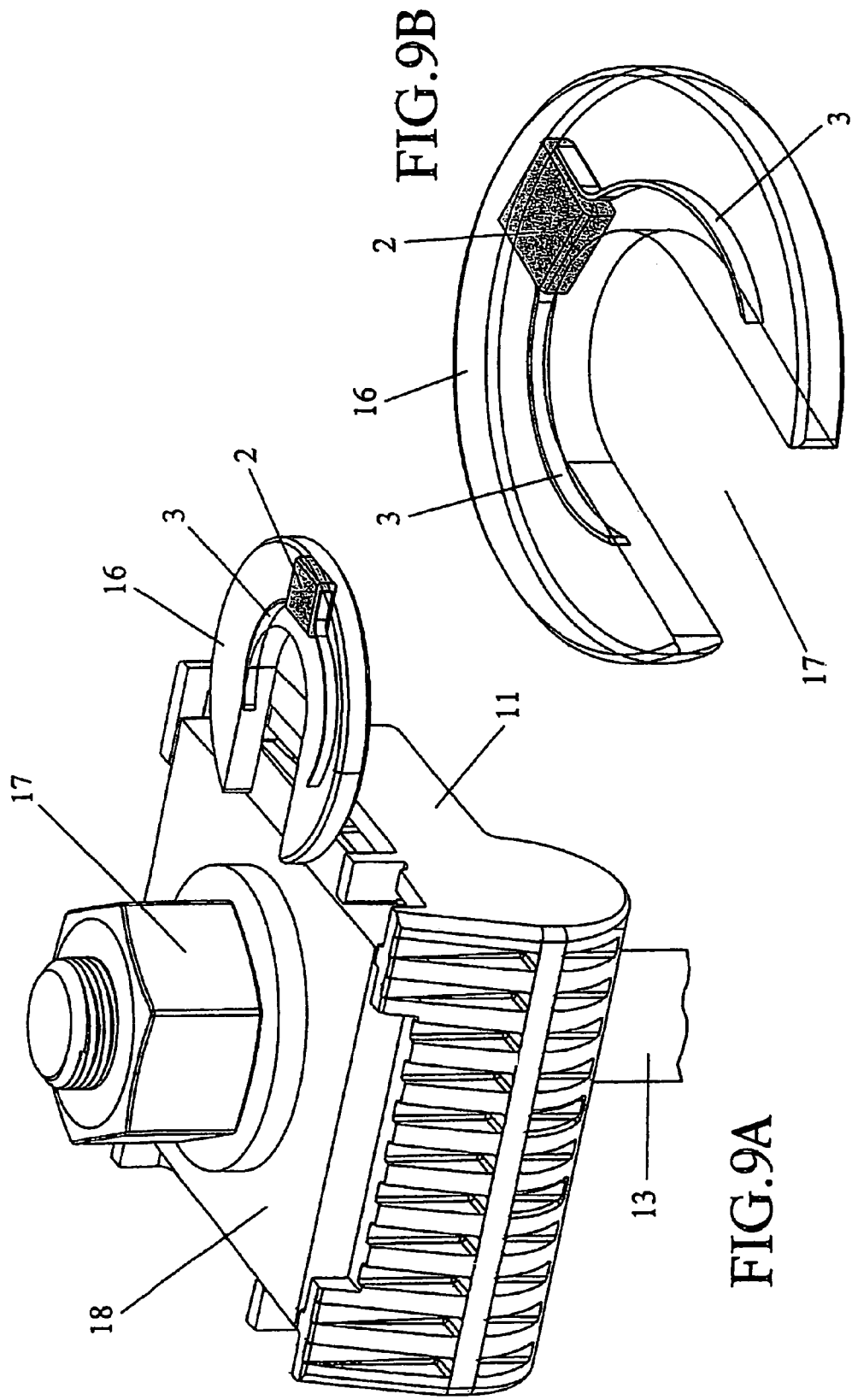

METHOD AND DEVICE FOR CONFIRMATION OF THE STATE OF TIGHTNESS OF FASTENINGS OF RAILROAD TRACKS

CROSS REFERENCE TO RELATED APPLICATIONS

The present application claims the benefit of U.S. Provisional Application No. 60/695,986, filed Jul. 1, 2005, herein incorporated by reference.

BACKGROUND

The present invention relates to a method and a device for automatic confirmation of the state of tightness of fastenings of railroad tracks, whereby from a train that is traveling over a track, it is possible to pick up a signal from each of the fastenings that indicates if the degree of tightness of the fastenings is appropriate or if, to the contrary, the degree of tightness of a particular fastening is not appropriate because it is either slack or damaged.

The upkeep costs of railroad tracks increase with the density of traffic, speed, axle load, and decrease in the weight of the rail. The traffic density is the main cause of deterioration of the tracks, by acting through the vertical and lateral dynamic total loads that the dense traffic transmits; these are transformed into fatigue and wear of the different devices or elements that form part of the fastenings of the tracks, as well as in the degradation of their geometry. This degradation will redound therefore, in the quality and in the safety of the track (defined by the standard deviations in the level, alignment, gage, etc.), the speed of the trains, and the maximum loads per axle.

Conventionally, to check and verify the state of fastening of the railroad tracks, operations are performed manually or by means of machinery in situ (that is, operative devices or mechanisms that are displaced periodically along the tracks) that include: a) reviewing, among other aspects, the tightness of the screws that cooperate in the fastening devices of these tracks, b) taking readings of torque, load or torsion, and c) proceeding to tighten those that are considered deficient.

In a railroad plant, it is known to use insulating plates for the resilient fastening of rails on crossties. Some of these plates are described in the following references: Spanish patent ES 2 115 427 relates to an insulating plate of resilient sheet type and Spanish patent ES 2 160 529 relates to an elbowed type with clip. Other known elements participating in the railroad plant include an anchoring sleeve like that described in the Spanish patent ES 2 125 603, or a resilient sole plate for railroad track such as that described in the Spanish patent ES 2 156 564. A known railroad installation is that shown in FIG. 1 of the above-mentioned ES 2 115 427 patent for an insulating plate of a resilient sheet type.

SUMMARY

The present invention resolves the technical problem outlined, by a device for confirming a tightness state of railroad track fastenings, comprising: a pressure sensor element; at least one electrically conducting element connected to the pressure sensor element, wherein both the pressure sensor element and the at least one electrically conducting element are associated with tightening mechanisms or elements, the tightening mechanisms or elements being capable of adjustment. The present invention further relates to a railroad plant, comprising: crossties; insulating fastening plates; rails mounted on the crossties in cooperation with the insulating fastening plates with screws passing through the plates and fixed in the crossties; and a device as previously described. Finally, a method is provided for confirming a tightness of railroad track fastenings, comprising: producing a variation of at least one electric value proportional to pressure of tightness present in at least one point in the fastening during passage of a train on a track.

In more specific terms, a first aspect of the invention relates to a sensor device for confirming a tightness state of railroad track fastenings which comprises a pressure sensor element and at least one electrically conducting element connected to the pressure sensor.

In the present invention, the term "fastenings" should be understood to signify any collection of elements which allow the securing in a point of a rail or line to a railway crosstie.

The pressure sensor element can be formed by a material with piezoelectric properties, or it can consist of a capacitor of variable capacitance, or another type of sensor which allows the pressure to be determined in a point of the fastening. Furthermore, the conductive element may be capable of radiating and/or receiving electromagnetic energy.

Another aspect of the invention relates to an insulating plate for fastening rails on crossties, which incorporates a device like that previously described. The sensor device formed by the pressure sensor element and the radiant element can be embedded in the plate itself as a result of the molding of the this plate, or it can be coupled later to the same in a cavity intended for such purpose.

The invention also relates to conventional railroad plant formed by rails mounted on crossties in cooperation with insulating fastening plates and screws passing through the plates, which incorporates the previously described sensor device, which can be coupled in a point of the fastening which is considered appropriate to determine the state of tightness of the same.

For example, the pressure sensor can be in contact with the insulating plate and the crosstie, or between the insulating plate and the rail, or between the insulating plate and a fastening clip, or between the resilient plate and a resilient sheet.

Another aspect of the invention relates to a method to check the state of tightness of fastenings of railroad tracks, in which a variation is produced of at least one electric and/or magnetic value proportional to or indicative of the tightness pressure present in at least one point in said fastening during or after the passage of a train. The variation of the electric values can consist in a variation of an emission of electromagnetic energy, in a variation of frequency, current or amplitude of a signal, originated by the passage of a train over a fastening which is transformed into a variation of pressure on a pressure sensor located in the fastening.

By acquiring these variations of the electric and/or magnetic magnitudes produced in each fastening, it is possible to determine the forces to which the fastening is subjected and, consequentially, know if the degree of tightness of the same is appropriate. The acquisition of these electric and/or magnetic variations can be obtained from a receiver located, for example, in a train which is traveling on the track.

Various embodiments of the present invention manage to avoid the highly laborious work that is signified by manually checking the plant, due to the number of kilometers of track which must be periodically inspected in situ, reducing the cost of upkeep and maintenance of the same considerably, as well as providing evidence of the track security both to the officials and to the users that employ these mechanisms of transport. Since confirmation of the state of the fastenings can be performed automatically with a train running normally, the supervision of the track can be carried out in a continuous manner during the day, whereby any damage in a fastening is rapidly detected.

To this end, a device in accordance with various embodiments of the invention comprises a pressure sensor element and at least one electrically conducting element connected to said pressure sensor, whereby a variation is produced of at least one electric magnitude proportional to the pressure of tightness present in at least one point in said fastening during the passage of a train.

The various embodiments of the invention also relate to an insulating plate for fastenings and to an installation of, railroad tracks which incorporate a sensor device object of the invention.

DESCRIPTION OF THE DRAWINGS

The following drawings are provided that relate to the description below in accordance with a preferred example of practical embodiment of the invention. The illustrated embodiments shown are in no way to be construed as limiting the invention.

FIG. 8A is a pictorial perspective view of an insulating plate with a device with piezoelectric sensor embedded in said plate;

FIG. 8B is a pictorial top view of an insulating plate with a device with piezoelectric sensor embedded in said plate;

FIG. 9A is a pictorial perspective view showing an assembly formed by an insulating plate, screw and securing nut, metallic Resilient Sheet and enclosure with sensor device in coupling position;

FIG. 9B is a pictorial perspective view showing an enlargement of the enclosure with piezoelectric sensor and radiant element;

DETAILED DESCRIPTION OF THE PREFERRED EMBODIMENTS

Figure 1:
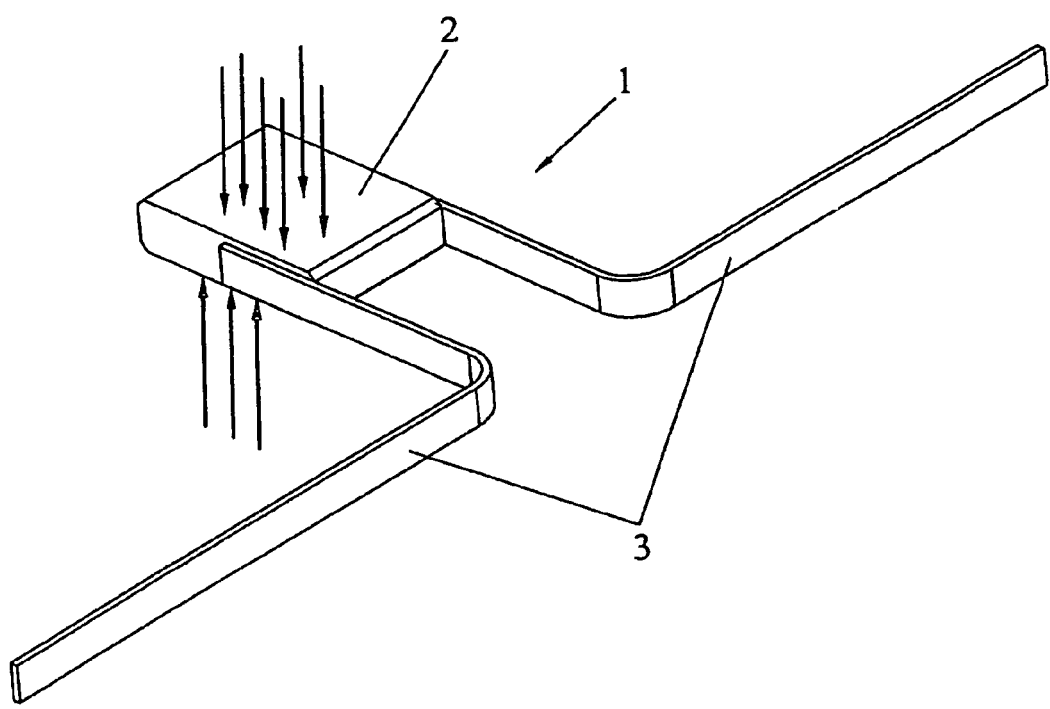
FIG. 1 is an isometric pictorial view showing an embodiment of a device with piezoelectric sensor for confirming the tightness state of railroad track fastenings. Arrows illustrate the variation in compression which the sensor undergoes.

FIG. 1 illustrates how, in one of the possible embodiments of the invention, the device 1 for confirming a tightness state of railroad track fastenings, comprises a pressure sensor element 2 and at least one electrically conducting element 3 capable of radiating and/or receiving electromagnetic energy, which is connected electrically to said pressure sensor 2. In the case of FIG. 1, the pressure sensor 2 comprises of a material with piezoelectric properties with rectangular prismatic form, which is intended to receive an impact of pressure on the passage of the train over the track. In the embodiment of FIG. 1 the conductive element 3 comprises of a dipole antenna formed by two L-shaped arms arranged symmetrically to each other and each connected to a face of the sensor 2.

The material with piezoelectric properties can be, for example, quartz crystal, Rochelle salt, or ceramic or polymeric materials.

The conductive element can comprise: an electrode, plate, open or closed loop, coil, a layer of conducting ink or paste. The conductive element can be, for example, an antenna of the following types: monopole, dipole, vertical monopole, dipole parallel to a conductive plane, frame antenna, spiral antenna, coplanar antenna, radiofrequency antenna, planar antenna, or printed antenna.

Figure 2:
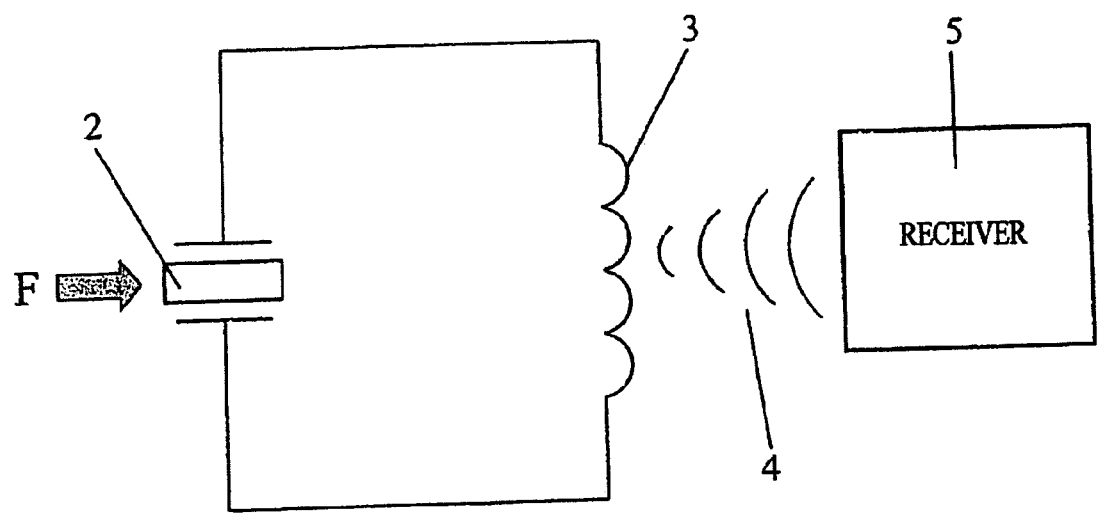
FIG. 2 is a an electrical schematic diagram corresponding to the operation of the device of FIG. 1.

The operation of the sensor device 1 is illustrated in FIG. 2, where it can be seen that an impulse of force F applied to the pressure sensor 2, piezoelectric in this case, produces a pulse of electric voltage in the conductive element 3, be it an antenna or a coil, which produces an electromagnetic field 4 which will be proportional to the magnitude of said impulse of force. The aforementioned impulse of force on the sensor 2 is caused by the compression-relaxation of the resilient sole plate produced by a wheel of a train on passing over the fastening of the track in which the sensor device 1 is located.

In a railroad track installation according to an embodiment of the invention that is equipped with a sensor device 1, the aforementioned electromagnetic field 4, can be picked up by a receiving unit 5 which can be installed, for example, in a railroad track maintenance vehicle adapted for such a use, or in a conventional train running normally over the track. The implementation of the receiving unit 5 is obvious for any expert in the field, for which reason it will not be further described.

Figure 3:
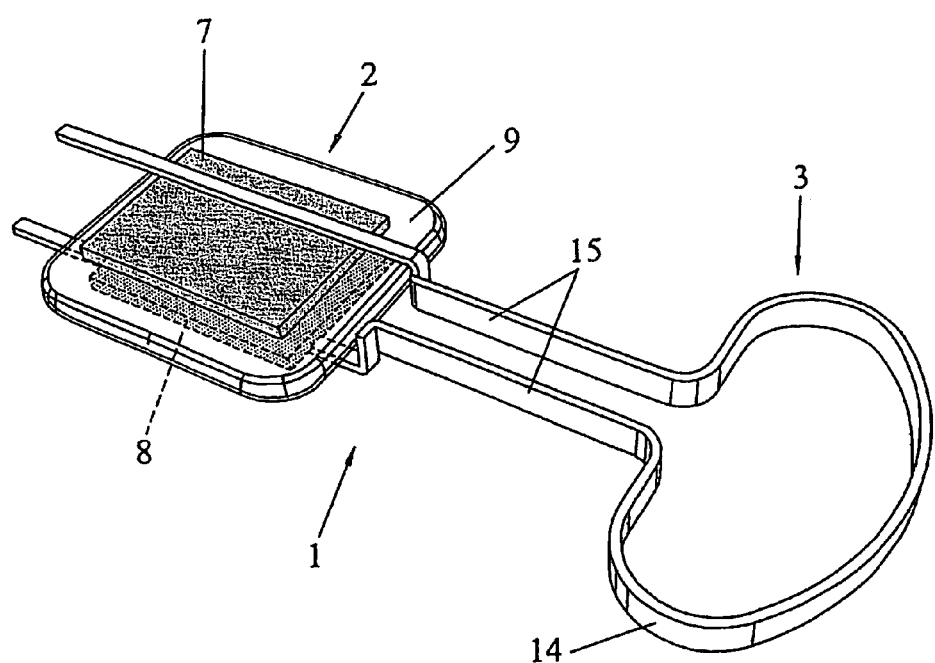
FIG. 3 is an isometric pictorial view showing another embodiment of a device with a capacitive sensor for confirming the tightness state of railroad track fastenings.

Another possible practical embodiment of the invention is represented in FIG. 3, and it consists of a sensor device 1 in which the pressure sensor element 2 comprises a capacitor of variable capacitance formed by two conducting plates which form respectively an upper electrode 7 and a lower electrode 8 separated from the upper one. A dielectric material 9 is located between the two electrodes 7, 8, which can comprise, for example, air, polymeric materials such as Polystyrene, Polyester, Polycarbonate, etc.

In the same example of embodiment as FIG. 3, the conductive element 3 is an antenna which forms a loop 14 and individual arms 15 which are connected electrically with the electrodes 7 and 8. The assembly formed by the sensor 2 and the conductive element 3 may be substantially planar, the object being to facilitate the installation thereof in the fastening of the railroad track.

Figure 4A:
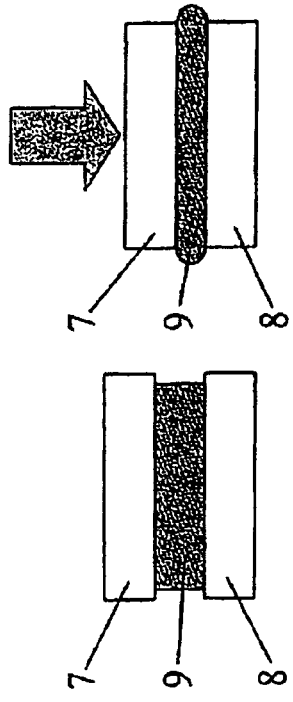
FIG. 4A is a pictorial side view illustrating operation of a variable capacitor.

The plates which define the electrodes 7 and 8 can be separated or distanced from each other so the separating gap depends on the pressure to which they are subjected in their disposition in a fastening of the track, in the idle state or during the passage of a train. As is appreciated from FIG. 4A, in the separation or approximation of the electrodes 7 and 8, a variation is produced in the capacitance of the capacitor and a deformation of the volume occupied by the dielectric 9.

When the train passes over, the resilient sole plate is compressed releasing pressure in the insulating plate, whereby the electrodes are separated. As the wheel of the train moves away from the fastening, the resilient sole plate recovers its thickness, whereby the pressure in the insulating plate is decreased, producing the increased separation of the electrodes. The electrode plates are fastened to a substrate (in this case, the plastic of the insulating plate) and the plates are moved next to the substrate when the latter recovers its initial position (when the load disappears) due to the resiliency of the material (in this case, that of the plastic).

These changes in the capacitance of the capacitor are indicative of the forces of tightness present in the fastening of the track, and therefore allow the state of tightness of said fastening to be determined. These changes in the capacitance of the capacitor can be detected via a transmitter/receiver unit 10 like that represented in FIG. 4B, using, for example, techniques already known, including frequency tracking.

The techniques of frequency tracking are based on altering a transmitted frequency in a controlled manner, and recording a response (received signal) at that same frequency. This procedure is carried out over a range of frequencies or bandwidth, hence the name "tracking". With it, it is possible to detect, within the bandwidth of frequencies, a maximum or minimum reception level (depending on the parameter being read), determining a resonant frequency, which will be related with the variations of the electric magnitudes on which the system is based.

Figure 4B:
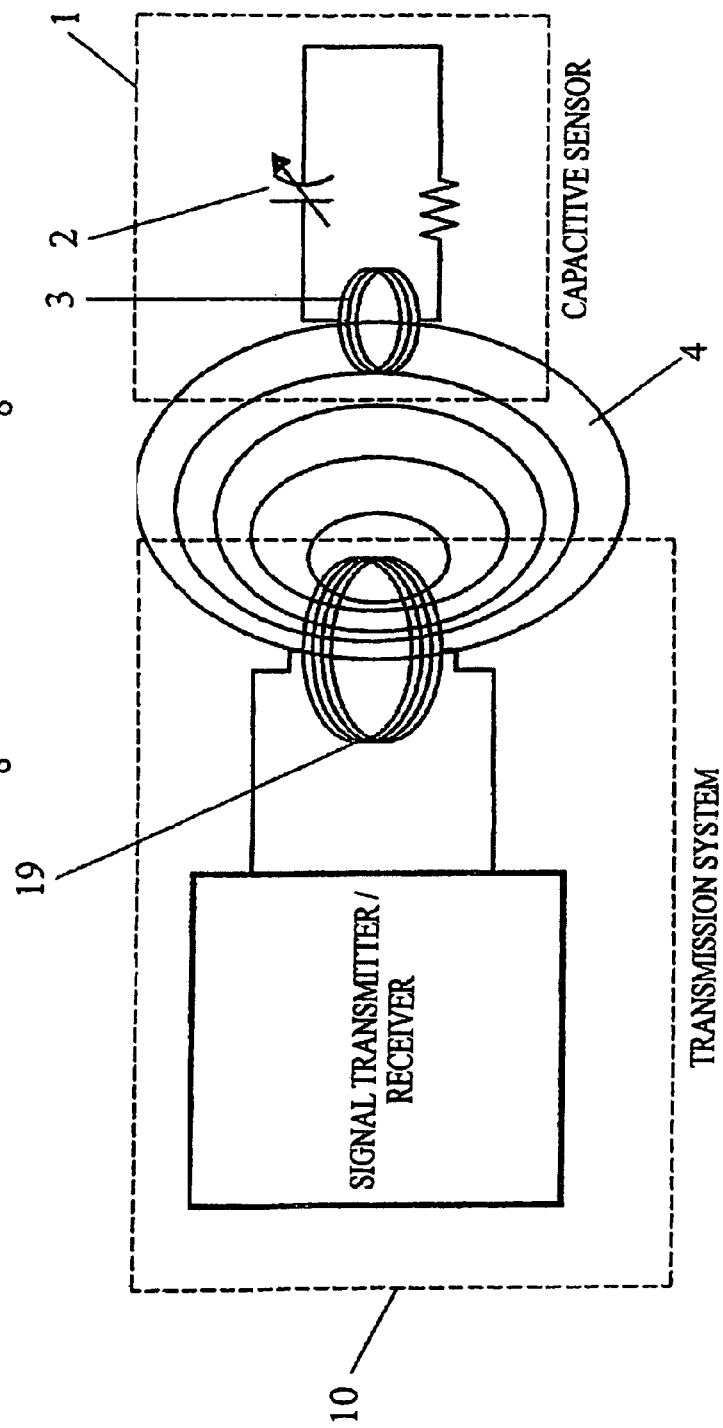
FIG. 4B is an electrical schematic diagram corresponding to operation of the device of FIG. 3.

In the diagram of FIG. 4B, the capacitive pressure sensor 2 and the conductive element 3 comprising an antenna, form a resonant circuit which will depend on the capacitance of the capacitor, and this in turn depends on the pressure to which the plates of the capacitor are being subjected in terms of the state of tightness of the fastening. In a particular assembly in which a magnetic coupling is implemented between transmitter/receiver and sensor and via a frequency "tracking", a minimum input impedance is found at a certain frequency. Knowing that frequency, the variations of electric magnitudes can be obtained, from which it is possible to obtain the information related to pressure or force.

Figures 7A, 7B:
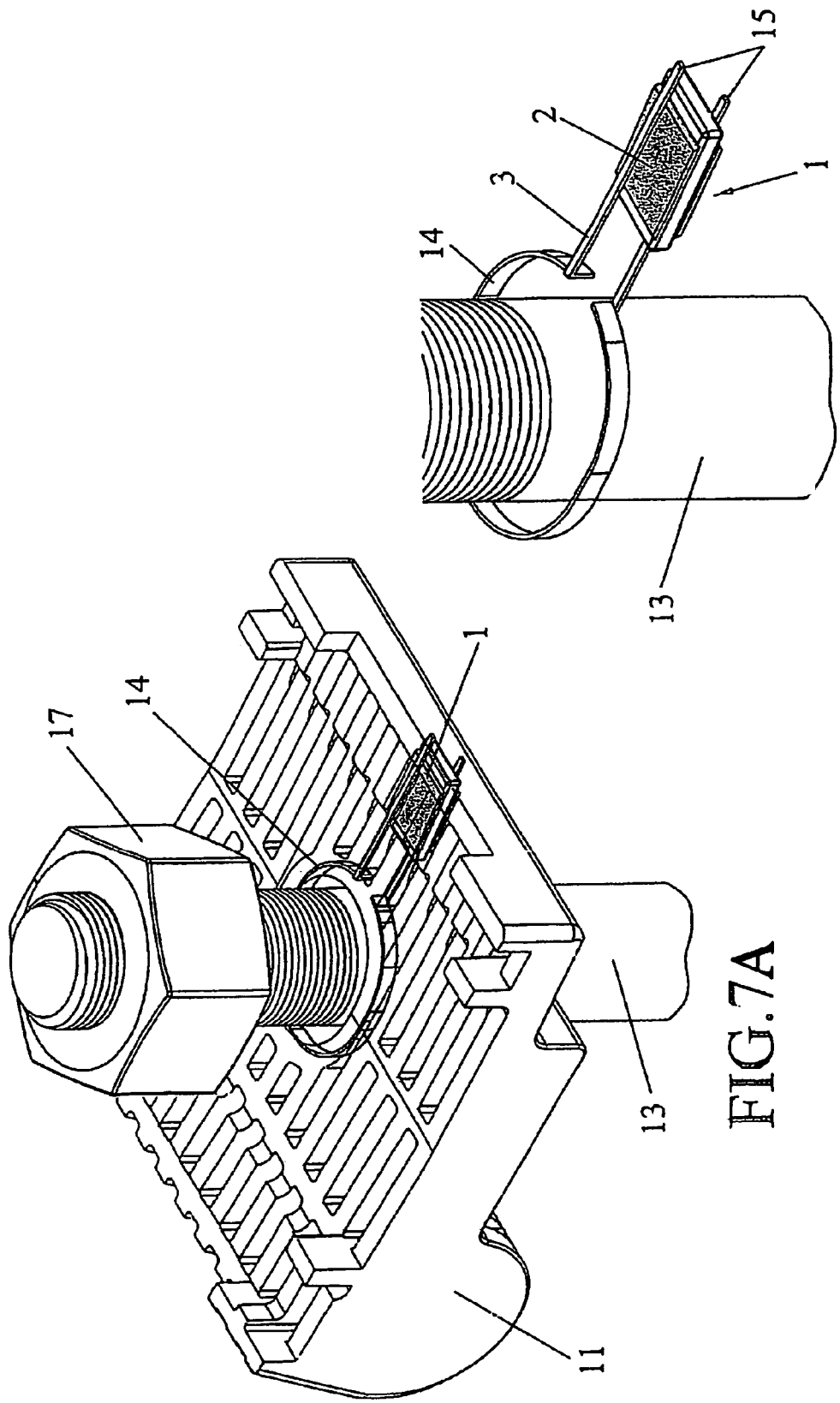
FIG. 7A is a pictorial perspective view showing an insulating plate together with a screw, inserted in the same, as well as device according to an embodiment of the invention mounted on the insulating plate.
FIG. 7B is a pictorial perspective view showing an enlarged detail of the relative disposition of the device and screw of FIG. 7A.

In the case of an insulating plate 11, represented in FIG. 7A, a capacitive pressure sensor 2 is used and the conductive element 3 comprising an antenna which is arranged around an orifice 12 (see FIG. 8A for an illustration of the orifice 12) in the plate 11 for the passage of a screw 13 so that once the screw 13 is installed, the latter is arranged axially with respect to a loop 14 which forms the antenna. The antenna is connected to the electrodes 7 and 8 via arms 15. With the configuration of FIG. 7B, the screw 13 and the antenna are adapted so that the screw acts as a core of the loop, so that an electromagnetic radiation which is detected by the screw 3 is induced in the loop 14 of the antenna.

An expert in the field, can understand that any other type of pressure sensor element which allows an instantaneous variation of pressure to be transformed into a variation of an electric magnitude/value, lies within the scope of this invention.

In FIGS. 8A & B, another aspect of the invention is shown comrpising an insulating plate 11 for fastening rails on crossties which incorporates a sensor device 1, specifically, the sensor device represented in FIG. 1. The insulating plate 11 can be molded in its manufacturing process on said device 1, being completely or partially embedded inside said plate. The sensor device 1 can adopt any position considered appropriate on the plate 11.

Alternatively, the insulating plate 11 can be manufactured separately but forming therein a cavity or housing (not shown), appropriate in form to receive later a sensor device 1 which can be fixed on the same by any known technique. In this case, the sensor device 1 is at least partially accessible from the exterior of the plate 11.

In another example of an embodiment (FIGS. 9A & B), the sensor device 1 can have an enclosure 16 inside which the sensor device 1 is housed, in this case, a piezoelectric pressure sensor 2 and a conductive element 3 comprising a dipole antenna formed by two bent arms. In this configuration, the device is especially suitable for use in a railway plant already existing, such as is indicated in FIG. 9A where an enclosure 16 is shown, which, like a washer, can be coupled between a nut 17 and a metallic reinforcement plate 18 remaining pressed between both elements. For this purpose, the enclosure 16 can have a ring shape with a central hole for the passage of the screw 13 after undoing the nut 17, or as is the case of FIG. 9B, it can have a U shape having an opening 17 which allows the coupling thereof by simply loosening the nut 17, but without having to remove it totally.

The enclosure 16 simplifies the manipulation and installation of the sensor device, at the same time as it protects it from accidental damage.

Figure 5:
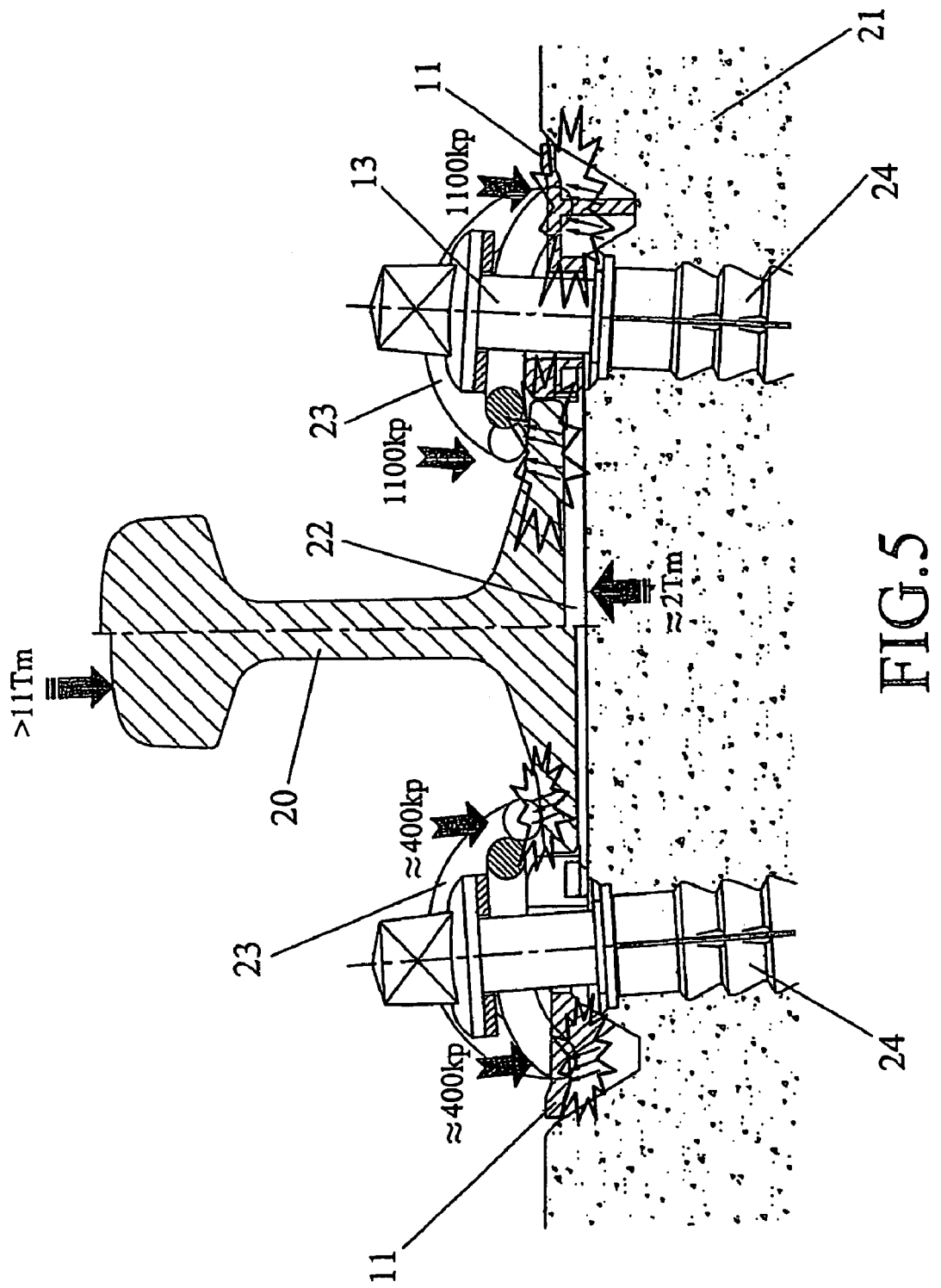
FIG. 5 is a pictorial front cross-sectional view of track installation which comprises an insulating plate of the CLIP type and fastening clip, in which the forces are indicated with arrows to which each element of the installation is subjected during the passage of a train. In the left half of this Figure, the state of the elements is represented at the exact moment in which they support the weight of a locomotive axle, and in the right half, the state of the elements in their normal state after the removal of this weight.
Figure 6:
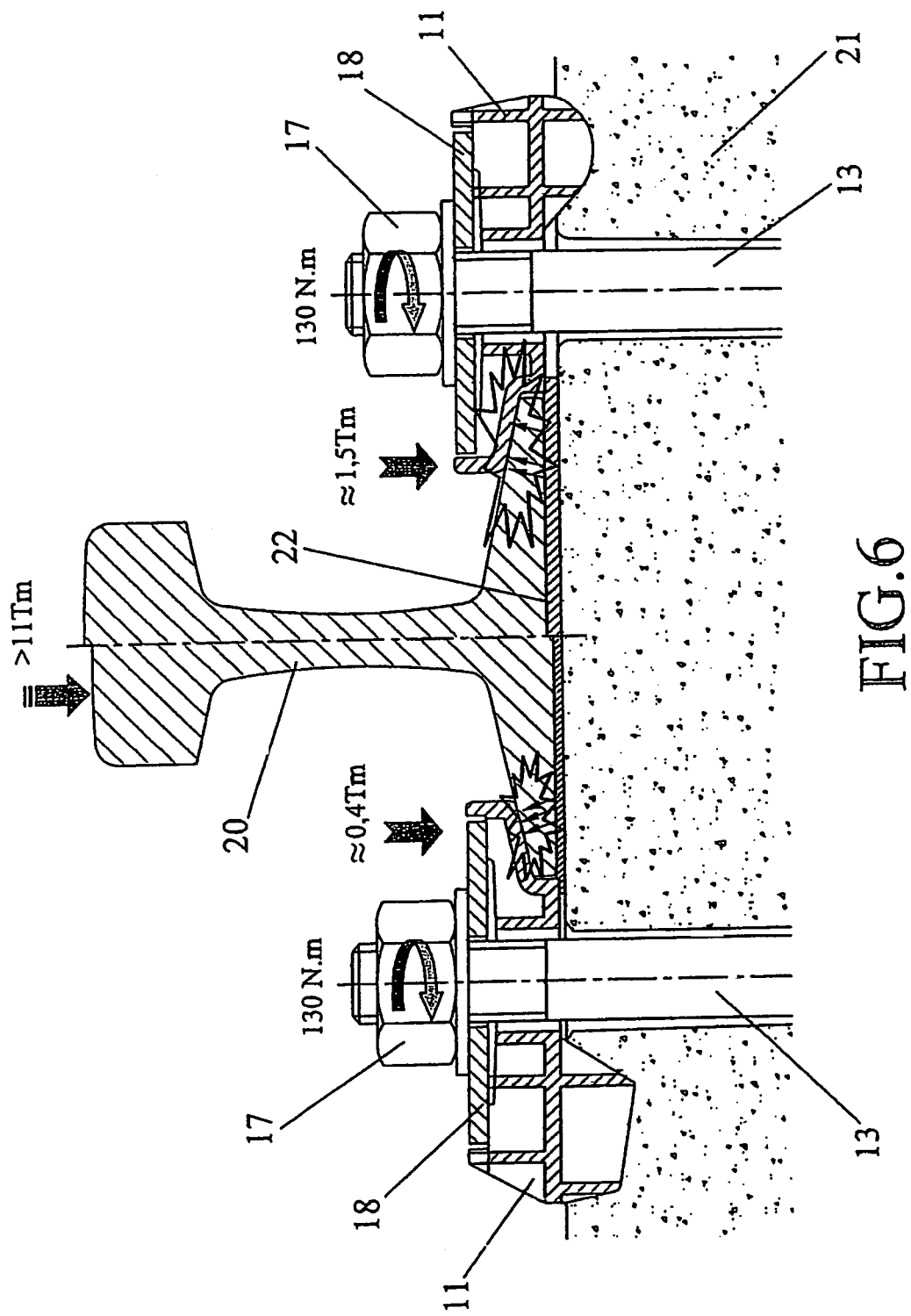
FIG. 6 is a pictorial front cross-sectional view similar to that of FIG. 5 but with insulating plates of the Resilient Sheet type.

Another aspect of the invention relates to railroad plant like that represented in FIGS. 5 and 6, and which incorporates a sensor device 1 like that defined in any one of the enclosed claims relative to said device, be it mounted independently or as an integral part of the insulating plate 11. The aforesaid railroad plant in the light of FIGS. 5 and 6, comprises a rail 20 mounted on a crosstie 21 in cooperation with an insulating fastening plate 11 on each side of the rail 20 and in cooperation with individual screws 13 passing through said plates 11 and fixed in the crossties 21. The bottom of the rail 20 rests on the crosstie 21 through a resilient sole plate 22.

In the case of FIG. 5, the insulating plate 11 is of the CLIP type which is used together with individual resilient clips 23 which make contact with the bottom of the rail 20 for the fastening thereof. The screws 13 are threaded into the crosstie 21 by means of respective threaded anchor sheaths 24. In the case of FIG. 6 insulating plates 11 of the Resilient Sheet type are used which contact directly with the bottom of the rail 20. The screws 13 retain said plates 11 by way of nuts 17 threaded on their upper end and metallic reinforcement plates 18.

In the present invention the term "fastenings" is to be understood as the collection of elements which allow the securing in a point of a rail or line to a crosstie. For the particular case of FIG. 5, the fastening is formed by the elements: insulating plate 11, screw 13, threaded sheath 24 and clip 23, and for the case of FIG. 6 the fastening is formed by the elements: insulating plate 11, screw 13, nut 17 and metallic Resilient Sheet 18. It will be evident for an expert in the matter that the invention is equally applicable to any other types of fastening formed by other elements.

Conventionally when the track is laid, on each side of the line or rail 20, individual screws 13 are tightened which cross through the insulating plate 11. By way of example with regard to the insulating plates of the Resilient Sheet fastening (FIG. 6), said screws 13 are tightened to a torque of 130 N-m (Newton-meter) which gives a load of approximately 4 Tm (metric ton), said load being distributed between the crosstie and the rail in equal parts, since the screw is approximately in the center of the insulating fastening plate 11.

Thus, the application of these approximately 4 Tm, two on each side, compress initially a rubber pad or the resilient sole plate 22 approximately 0.2 mm, which plate is located between the rail 20 and the crosstie 21. When a locomotive passes over a fastening, it applies a load thereon of 11 Tm 22 Tm per axle of the train wheels which causes this pad or resilient sole plate 22 to be compressed to an approximate total value of 1 mm. Under these conditions, it can be said that the resilient sole plate 22 which had accumulated an energy equivalent to a load of 4 Tm passes to have 11 Tm.

When the locomotive disappears from the point of the fastening, if the screws are tight, the pad or resilient seating plate will return to its initial compression of approximately 0.2 mm, whereby the fastenings will receive an impact of approximately 4 Tm. Said impact against the pressure sensor 2 located in an appropriate point of the fastening, in the case of being a piezoelectric sensor, produces a change of electric magnitudes with the provision of energy, which, on closing the circuit through the conductive and radiant element 3, produces in turn an electromagnetic pulse which is transmitted to a receiving unit located, for example, in the train itself.

If the tightness pressure of the fastening fails to reach an established value, for example, because it is loose, deteriorated or damaged, the impact against the piezoelectric is not produced with the intensity established for a fastening in perfect condition, which is reflected in the variation of an electric magnitude, either in the form of a variation in the amplitude of a signal, frequency, etc.

For the case of a capacitive sensor, a generating set is needed to produce an electromagnetic signal which, once transmitted to the energy reception system, will transform the electromagnetic field into energy to represent the state of the capacitive sensor and to transmit it by way of another electromagnetic field to the detector located in the train.

On the underside of the train, there can be a probe or electromagnetic detector (approximately at 60 cm) from the level of the ground, which, when it passes (approximately 91 crossties per second, when the speed is approximately 200 km/hour), will be able to detect the disturbance of said electromagnetic field if it is present, transmitting said signal to the transmitter/receiver equipped on the train, locating automatically in place and time the proper or deficient state of the fastenings.

In the event that disturbance of the radiofrequency signal does not occur or is not produced in the degree established, the signal to be detected will be different and therefore it would be likewise detectable. A suitable software program in the transmitter/receiver will transform this state into user language, automatically reporting the condition in which the securing fittings are found tie by tie.

The solution can be viable both in insulating plate fastenings and in bent plate with clip solutions, without discarding other types of securing different to the aforementioned which could arise in the future.

In the railroad installation, the pressure sensor is in contact with the insulating plate and the crosstie, or between the insulating plate and the rail, or between the insulating plate and a fastening clip. In greater detail, when the sensor device 1 is installed independently, the pressure sensor 2 (be it piezoelectric or a capacitive sensor) can be mounted under the nut 17 which accompanies the screw 13, for example, inserted in a washer or enclosure 16 as is shown in FIG. 9A.

In the case of the fastenings of the bent insulating plate type 11 with clip, the pressure sensor 1 can be located under the supporting point of the spring or clip 23 with respect to the bottom of the rail 20 or with respect to the plate 11, as indicated by the thin arrows of FIG. 5.

In the event that the sensor device 1 is embedded in the insulating plate 11, the pressure sensor 2 can be located between the plate 11 itself and the bottom of the rail 20 as indicated by the thin arrows of FIG. 6, or even between the insulating plate 11 itself and the metallic sheet 18 which is mounted in the upper segment thereof when securing in position. In all cases the effect is the same, since the tightening load of the screw 13 is distributed in equal parts, approximately 2 Tm on the crosstie and approximately 2 Tm on the rail.

Regarding the signals transmitted from the devices located in the fastenings of the track to the receiver located in the train, a difficulty can exist relative to the screening resulting from the ground plane of the train, of the rail or any nearby element and even by metallic elements of the train. To overcome these problems, it is convenient that the transmission from the point located in the fastening to the receiver mounted in the train be made by pointing and directing the signal in an appropriate manner.

To record in the transmitter to what specific crosstie the received signal belongs, different mechanisms can be used, like the railroad localization mechanism already present in the railroad centers, by GPS, by revolution counters according to the ratio of train speed to distance between crossties, etc.

Figure 10:
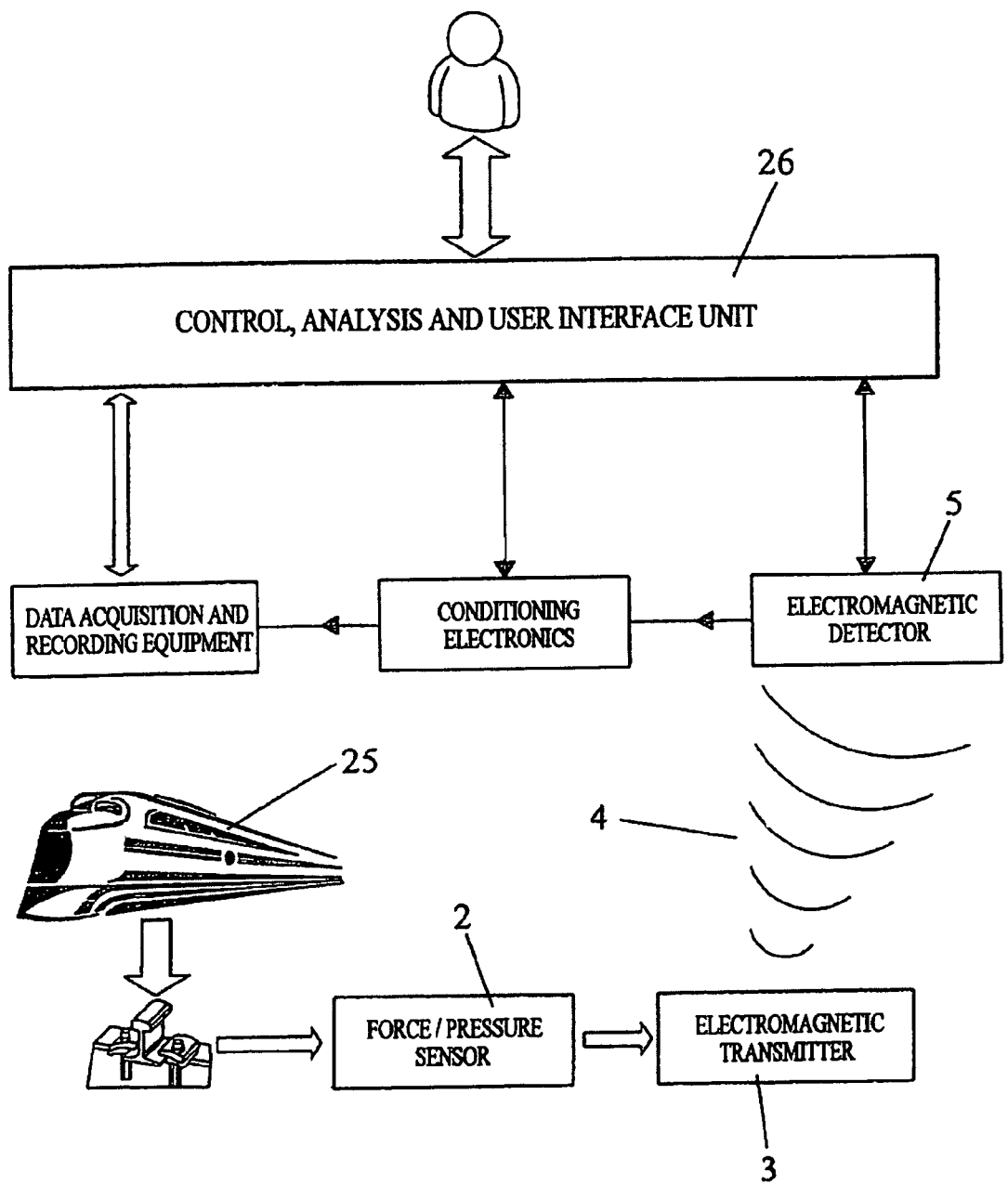
FIG. 10 is a block diagram illustrating the method for confirming the tightness state of railroad track fastenings, based on a self-powered system (e.g., when a piezoelectric sensor is used)

FIG. 10 shows a schematic diagram illustrating the method for confirmation of the state of tightness of fastenings of railroad tracks, based on a self-powered system, that is, when a piezoelectric sensor is used. The passage of a train 25 over a fastening of the track supplies the necessary pressure to the piezoelectric sensor so that the latter produces an energy pulse which is transformed into an electromagnetic signal via the antenna 4, which signal is detected by a receiver or electromagnetic detector 5, which can be located in the train 25 itself, whereby the acquisition of signals from the fastenings of all the crossties on an itinerary can be made from the train itself during the normal course of its journey. The receiver or electromagnetic detector 5 can belong to a unit for control, analysis and interface with the user 26 in which the signal detected is processed appropriately.

Figure 11:
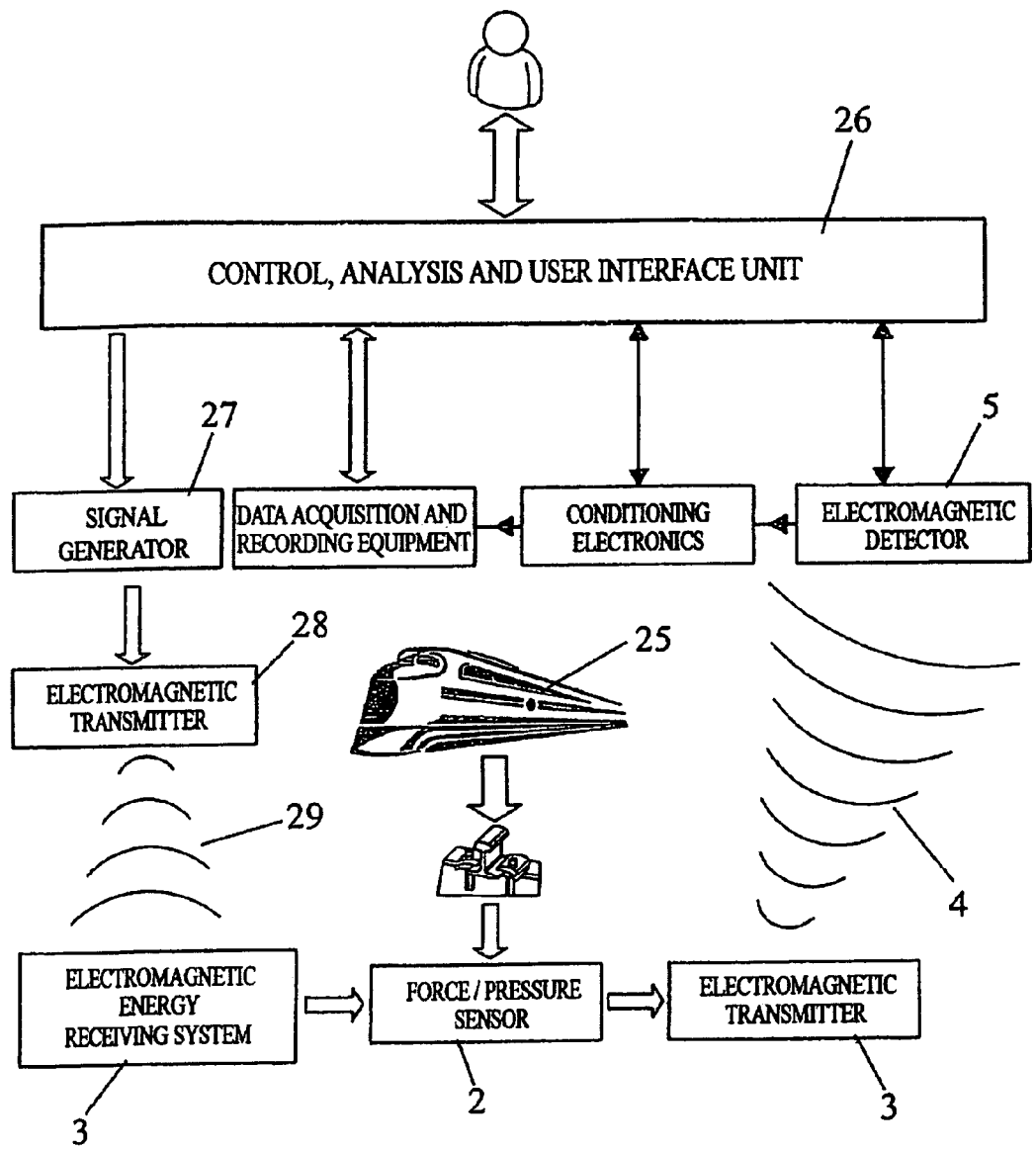
FIG. 11 is a block diagram illustrating the method for confirming the tightness state of railroad track fastenings, based on an externally powered system, (e.g., when a capacitive sensor is used and an electromagnetic transmitting unit necessary for powering the sensor.

In the case of FIG. 11, the method is based on an externally powered system, that is, it uses a capacitive sensor and an electromagnetic transmitting unit necessary for powering the sensor. In this system, the unit for control, analysis and interface with the user 26, which can be likewise installed in the train 25, employs a generator 27 to produce electromagnetic energy which is radiated by an electromagnetic transmitter 28, like an antenna or a loop for example. The electromagnetic signal 29 produced is received by the sensor device 1 installed in the fastening, specifically, the signal 29 is detected by the conductive element 3 which converts it into energy in order to represent the state of the pressure sensor 2 (in this case capacitive) and to transmit it by way of another electromagnetic signal 30. Preferably, it is possible to use the same conductive element 3 comprising an antenna for energy reception and signal transmission. Therefore, at least one magnitude of the electromagnetic signal 30 produced is variable in terms of the capacitance of the pressure sensor 2 comprising, in this case, of a variable capacitor, which, in turn, is proportional to or indicative of the pressure of tightness present in at least one point in said fastening during the passage of a train.

Diverse possibilities of practical embodiments of the invention are described in the enclosed dependent claims.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components conFigured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various Figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A device for monitoring a tightness state of railroad track fastenings, comprising:
   a pressure sensor element formed of a material with piezoelectric properties suitable for detecting pressure at a fastening point of a railroad track when a train passes over the fastening point;
   at least one radiating element electrically connected to said pressure sensor element, said radiating element being adapted to radiate and/or receive electromagnetic energy.

2. The device according to claim 1, wherein the radiating element is selected from the group consisting of: an electrode, a plate, an open loop coil, a closed loop coil, a layer of conducting ink, and a layer of conducting paste.

3. The device according to claim 1, wherein the radiating element is an antenna.

4. The device according to claim 3, wherein the antenna is selected from the group consisting of: a monopole, a dipole, a vertical monopole, a dipole parallel to a conductive plane, a frame antenna, a loop antenna, a coplanar antenna, a radiofrequency antenna, a planar antenna, and a printed antenna.

5. The device according to claim 1, wherein the piezoelectric material is selected from the group consisting of: quartz crystal, Rochelle salt, ceramic materials, and polymers.

6. The device according to claim 1, further comprising:
   an enclosure in which the sensor element and the radiating element are housed.

7. The device according to claim 6, wherein the enclosure has a central orifice.

8. The device according to claim 6, wherein the enclosure has a "U" shape.

9. An insulating plate for fastening of rails on crossties, comprising:
   an insulating plate body;
   a pressure sensor element formed of a material with piezoelectric properties suitable for detecting pressure at a fastening point of a railroad track when a train passes over the fastening point;
   at least one radiating element electrically connected to said pressure sensor element, said radiating element being adapted to radiate and/or receive electromagnetic energy.

10. The insulating plate according to claim 9, wherein the pressure sensor element is molded in said insulating plate body in its conformation phase so as to be at least partially embedded in said insulating plate body.

11. The insulating plate according to claim 9, further comprising an externally accessible housing, said pressure sensor element being located in said housing.

12. The insulating plate according to claim 9, wherein said insulating plate body defines a through-hole, said at least one radiating element being arranged around the through-hole.

13. The insulating plate according to claim 9, wherein said pressure sensor element is at least partially accessible from an exterior of said insulating plate body.

14. A railroad track installation, comprising:
   crossties;
   insulating fastening plates;
   rails mounted on the crossties in cooperation with the insulating fastening plates with screws passing through the plates and fixed in the crossties; and
   a device according to claim 1.

15. The track installation according to claim 14, wherein the electrically conducting element of the device is mounted at least partially around the screw.

16. The track installation according to claim 15, wherein the screw detects electromagnetic radiation which is induced in the conducting element.

17. The track installation according to claim 14, wherein the device is incorporated in the insulating plate.

18. The track installation according to claim 14, wherein an enclosure in which the sensor element and the conducting element are housed is located around the screw and between the insulating plate and a nut threaded on the screw.

19. The track installation according to claim 14, wherein the pressure sensor is located in at least one of the following:
   in contact with the insulating plate and the crosstie;
   between the insulating plate and the rail;
   between the insulating plate and a fastening clip; and
   between the insulating plate and the resilient sheet.

20. A method for confirming a tightness of railroad track fastenings, comprising:
producing a variation of at least one electric value proportional to pressure of tightness present in at least one point in the fastening during passage of a train on a track; and
producing an emission of electromagnetic radiation corresponding to said variation.

21. The method according to claim 20, further comprising:
producing the emission of electromagnetic energy via a pressure sensor connected to a radiant element, the sensor being located in an appertaining point of the fastening.

22. The method according to claim 21, further comprising:
forming the pressure sensor with a material with piezoelectric properties; and
producing the variation of the electrical value by subjecting the material to an impact of pressure from the passage of the train.

23. The method according to claim 20, further comprising the step of:
detecting the electromagnetic signal by a receiver on a train that is traveling on the track.

* * * * *